United States Patent [19]

Umeda et al.

[11] 4,041,453
[45] Aug. 9, 1977

[54] SIGNAL HANDLING SYSTEM FOR MINIMIZING DROPOUT EFFECT

[75] Inventors: Kenkichi Umeda; Shoichi Nakamura, both of Tokyo; Jun Takayama, Kokubunji; Tetsuya Horichi, Yokohama; Yoshikazu Tsuchiya, Tokyo, all of Japan

[73] Assignee: Sony Corporation, Tokyo, Japan

[21] Appl. No.: 523,918

[22] Filed: Nov. 14, 1974

[30] Foreign Application Priority Data

Nov. 20, 1973 Japan .................. 48-130405

[51] Int. Cl.² .................................. H03K 13/243
[52] U.S. Cl. ........................ 340/146.1 BE; 360/38; 340/347 DD; 360/39
[58] Field of Search ............ 340/347 DD, 146.1 F, 340/348, 146.1 BE, 350, 171 PF; 235/153 R, 153 BN; 360/38, 39

[56] References Cited

U.S. PATENT DOCUMENTS

| | | | |
|---|---|---|---|
| 3,093,707 | 6/1963 | Nicholson et al. | 178/23 |
| 3,235,661 | 2/1966 | Oxley et al. | 340/347 DD X |
| 3,484,782 | 12/1969 | Schmidt | 340/348 |
| 3,657,699 | 4/1972 | Rocher et al. | 340/146.1 |
| 3,703,719 | 11/1972 | Beyer et al. | 340/347 DD |
| 3,708,783 | 1/1973 | Hedin | 340/146.1 F X |
| 3,716,675 | 2/1973 | Marek, Jr. et al. | 179/18 ET |
| 3,742,137 | 6/1973 | Garland | 178/17 C |
| 3,764,787 | 10/1973 | Kamanaka | 235/152 |
| 3,836,908 | 9/1974 | Hegendorfer | 340/347 DA |
| 3,842,414 | 10/1974 | Chen et al. | 340/347 DD |

OTHER PUBLICATIONS

Analog Devices, Inc., Analog-Digital Conversion Handbook, 6/72, pp. I-42 to I-47 & II-34 to II-37.

Primary Examiner—Thomas J. Sloyan
Attorney, Agent, or Firm—Lewis H. Eslinger; Alvin Sinderbrand

[57] ABSTRACT

A system for handling pulse encoded signals includes several parallel signal paths to carry pulses on which a signal has been encoded. The encoding is based on a predetermined amplitude value, or weight, for each pulse, and each signal path receives all pulses having the same weighting factor. A switching system is provided to switch the signals received on the various paths to different paths in a determinable order at a repetition rate commensurate with the pulse encoding repetition rate. The signals are then transmitted along the signal paths and are then switched back to the original order for pulse decoding. If pulse bits are lost in the second path, an interpolation may be made to provide a reasonable restoration of the signal to minimize the dropout effect. The switching of signals back to the original order virtually eliminates the possibility of having two successive dropouts of the same pulse weight in the signals to be decoded, and thus eliminates the possibility of having no standard of interpolation in the reconstructed signal.

11 Claims, 15 Drawing Figures

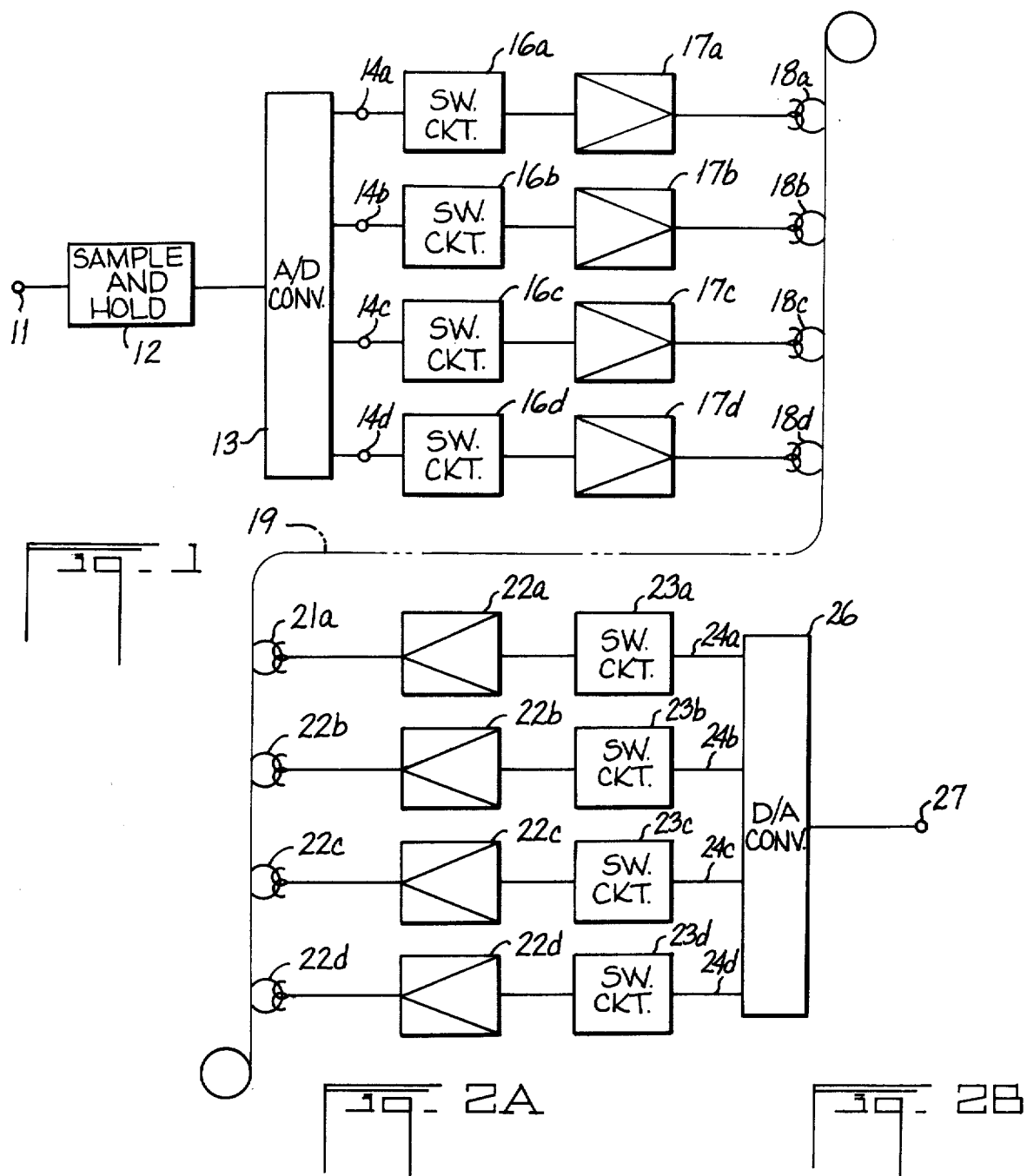

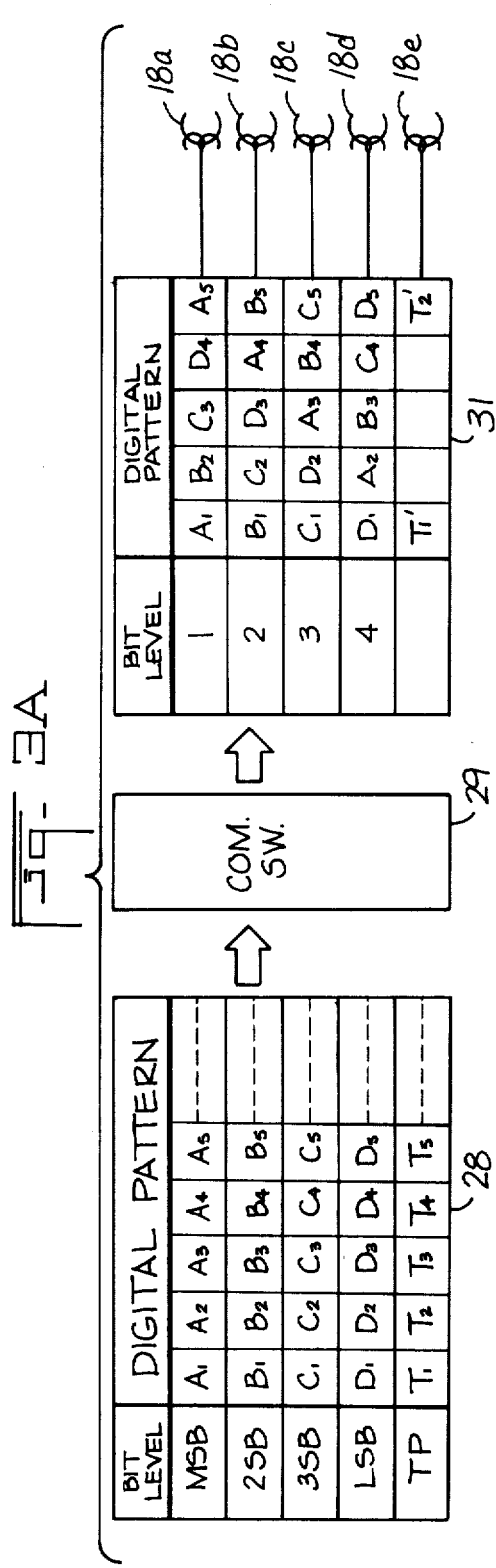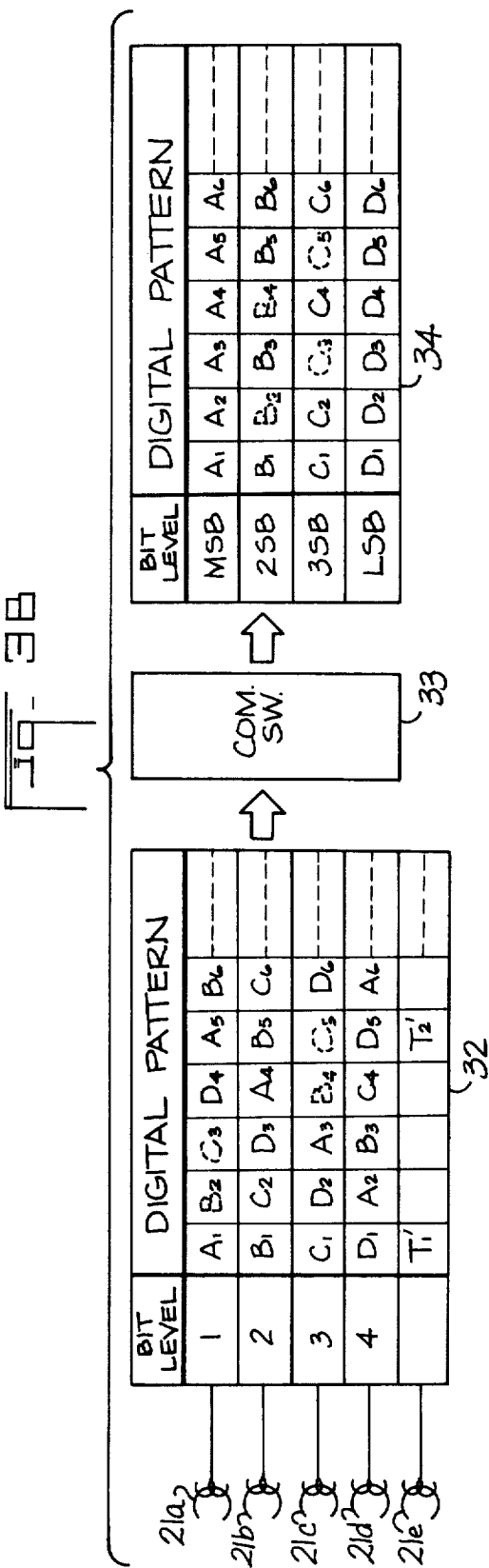
Fig. 3A
Fig. 3B

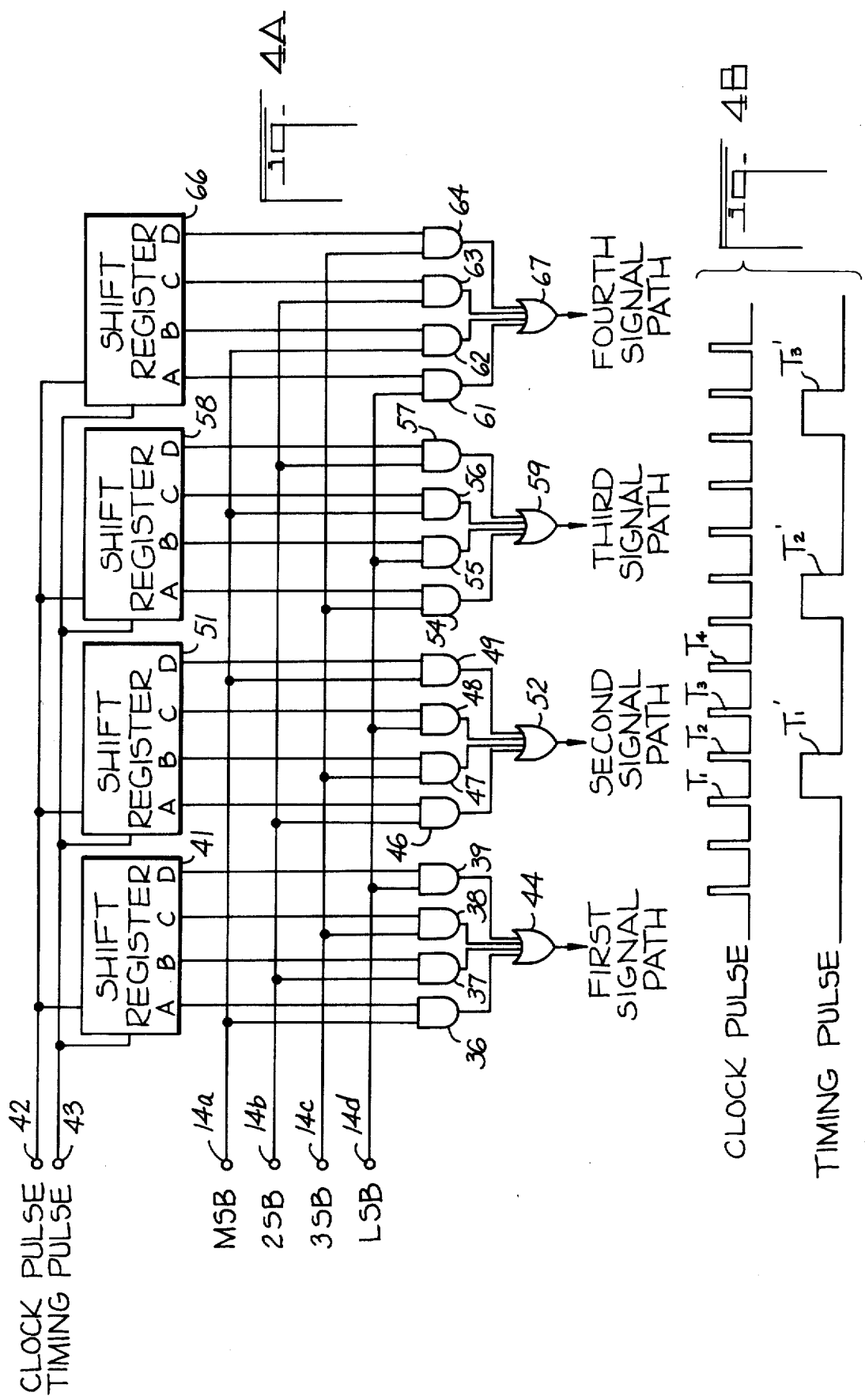

FIG. 7A, FIG. 7B, FIG. 7C, FIG. 8A, FIG. 8B, FIG. 8C

SIGNAL HANDLING SYSTEM FOR MINIMIZING DROPOUT EFFECT

BACKGROUND OF THE INVENTION

1. Field of the Invention

This invention relates to a system for handling pulse encoded signals to minimize the effect of dropouts of such signals when they are transmitted along electrically parallel paths.

2. The Prior Art

It is common practice to encode pulse signals to correspond to the amplitude of an analog signal measured, or sampled, at specific time intervals. A typical pulse code modulation system involves producing a multi-digit pulse signal for each measurement of the analog signal. The encoding system uses a certain number of pulses for each code group, and the pulses are typically based on the binary value that corresponds to the analog amplitude. For example, a four-digit pulse signal could be used to encode an analog signal having a value between 0 and 15 volts by assigning to the pulses certain amplitude values separated by 1 volt of the analog signal amplitude. Thus, in the system that provided time for transmitting the four pulses, and with each of the pulses having either a value identified as 0 or 1, a group of pulses 1010 would correspond to an analog voltage of 10 volts.

In transmitting such pulse signals it has been common to separate the pulses of each group according to the weighting factor of each pulse. In the case of a four-digit pulse signal, four electrically parallel signal paths would be required. One path would transmit the first digit signal, which would be either a 1 or a 0, a second path would transmit the second digit, a third path the third digit, and a fourth path the fourth digit. In demodulating the four-digit pulse signal to reproduce the analog signal having a value between 0 and 15 volts, the fourth digit pulse signal, which is also called the fourth bit, would add one volt to the analog signal obtained after demodulating the first three digits. Thus, the fourth digit signal is spoken of as having a weighting factor of one and is called the least significant bit. Correspondingly, the third digit signal, or third significant bit, would affect the analog value of the demodulated signal by 2 volts, or twice as much as the least significant bit signal. The second digit pulse signal, or second significant bit, would affect the value of the analog signal by twice as much as the third significant bit, or 4 volts in the example being considered, and the first digit pulse signal, which is also the most significant bit, would affect the value of the demodulated analog signal by twice as much as the second significant bit, or 8 volts in the example.

Analog signals that have been encoded in this pulse form can be transmitted in parallel paths so that all of the digits will arrive at the other end of the path simultaneously. In order to be translated back into an analog signal form, the output pulse signals from the transmission paths must be decoded in the proper sequence and given the proper weighting factor. To refer again to the example, a pulse signal 0001 would be decoded into an analog signal of 1 volt and a pulse signal 1111 would be decoded into an analog signal 15 volts. Signals corresponding to binary numbers 0001 and 1111 would be decoded as analog signals having values between 1 and 15 volts.

It unfortunately happens that sometimes one bit of a multibit, or multi-digit, pulse signal is lost in the transmission path. For example, the transmission path may consist of magnetic tape, and a small particle of dust may interfere with the recording of one of the bits of the signal. Another possibility is that there may be a scratch or some other defect on the magnetic surface of the tape that causes the magnetic material to be missing at a certain place where one of the bits should be recorded. If the missing bit happens to be the least significant bit, the resulting analog signal will not be changed very much (unless the loss of a single bit offsets the entire decoding system) but if the bit that is lost is the one that has the greatest weighting factor and is, therefore, known as the most significant bit, it will at least change the amplitude of the decoded signal by a large amount.

The loss of one bit of a multi-digital signal has heretofore been compensated for by arbitrarily assuming that the value of the signal did not change between the preceding group of signals and the group in which there was a missing bit or between the group in which there was a missing bit and the succeeding group of signals. By replacing the missing bit with the bit of the same weighting factor from either the succeeding or following group of signals, based on the assumption that the value of the amplitude signal will not vary much from one sample to the next, a reconstituted digital signal can be produced that is likely to be of the correct value or at least not greatly different from the correct value. However, it sometimes happens that two or more bits in succession on a given transmission path will be dropped out, and then it becomes difficult to reestablish a reasonable value for the missing bits.

In transmitting pulse coded signals it is frequently desirable that they not be required to maintain a base value that corresponds, for example, to the 0 level and with all of the pulses that represent 1's differing from the 0 value in one polarity. A signal that is arranged so that 0 signals have one polarity and 1 signals have the opposite polarity may be preferred. In the case of such signals, the voltage swings back and forth between the two values and does not return to 0. Such signals are, therefore, referred to as non-return-to-zero or NRZ signals. The loss of one bit of an NRZ signal may cause the voltage in the transmission path to return to zero, which is an ambiguous condition since it represents neither a 1 nor a 0. This makes it more difficult to interpolate for a missing bit or a missing succession of bits of the same weighting factor.

Since the encoding is based on time, it is necessary to transmit timing information along with the multi-digit pulse signal. The timing information can be sent on a separate parallel signal path, but this is undesirable because it takes one of the available signal paths that might otherwise be used for more useful information. Accordingly, signals that have been encoded as pulses are sometimes subjected to further encoding by what is known as dynamic modulation (DM) or phase encoding (PE). Such signals include timing information without the necessity of providing an extra channel. However, it is necessary to adhere to the requirements of such signals in replacing dropout signal bits.

Accordingly, it is one object of the present invention to provide a singal handling system for minimizing dropout effects in multi-digit signals transmitted along parallel signal paths.

Another object is to provide for minimizing errors that might be caused by the dropout of bit signals of NRZ pulse code modulation signals.

A still further object of the present invention is to provide a handling system to minimize errors caused by dropout of bit signals that include timing information along with the signal information.

Still further objects of the present invention will be apparent from the following specification together with the drawings.

SUMMARY OF THE INVENTION

According to the present invention, pulse coded signals arranged in groups, each of which groups is representative of the amplitude of the encoded signal at a certain time, are applied to a plurality of electrically parallel signal transmission paths. Each pulse in each group has a certain weighting factor, and there is a separate transmission path for all of the pulses of a given weighting factor. At the input to the paths is a switching system that changes the connections of the various pulses for each group of pulses. By operation of the switching system, the transmission paths that carry, respectively, the most significant bit, the second significant bit, the third significant bit, and so on of one group of pulse signals will carry a different significant bit signal of the next group. At the output of the transmission paths a corresponding switching system returns the bits to their original order to be decoded into an analog signal.

As a result of the switching systems at each end of the transmission paths, successive dropouts of signals on any one of the paths will not appear in the reswitched output pulse signal as dropouts of successive bit signals of the same weight. Thus, it is possible to reconstitute the bit signals by comparison with preceding and succeeding bit signals of the same weight which will not have been dropped out. This makes it possible to reconstitute the analog signal on the basis of a reasonable approximation.

BRIEF DESCRIPTION OF THE DRAWINGS

FIG. 1 is a block diagram showing both the input and the output of a system for reducing dropout signal loss according to the present invention.

FIG. 2A is a chart of a pulse code system for a series of analog signal values.

FIG. 2B is a chart that corresponds to FIG. 2A that illustrates signal dropouts.

FIG. 3A is a chart that represents the effect of signal bit switching in accordance with the present invention.

FIG. 3B is a chart similar to FIG. 3A but illustrates the effect on dropout signals of the type depicted in FIG. 2B.

FIG. 4A is a logic diagram that corresponds to the switching system capable of carrying out the switching represented in FIG. 3A and FIG. 3B.

FIG. 4B shows timing pulses used in the operation of the circuit in FIG. 4A.

FIGS. 7A-7C are charts corresponding to correct signal handling of pulse code modulated signals switched according to the system of the present invention and dynamically modulated.

FIGS. 8A-8C correspond to FIGS. 7A-7C but illustrate the effect of placing the switching means and dynamic modulation means in incorrect order.

DETAILED DESCRIPTION OF THE PREFERRED EMBODIMENT

Figure 5:
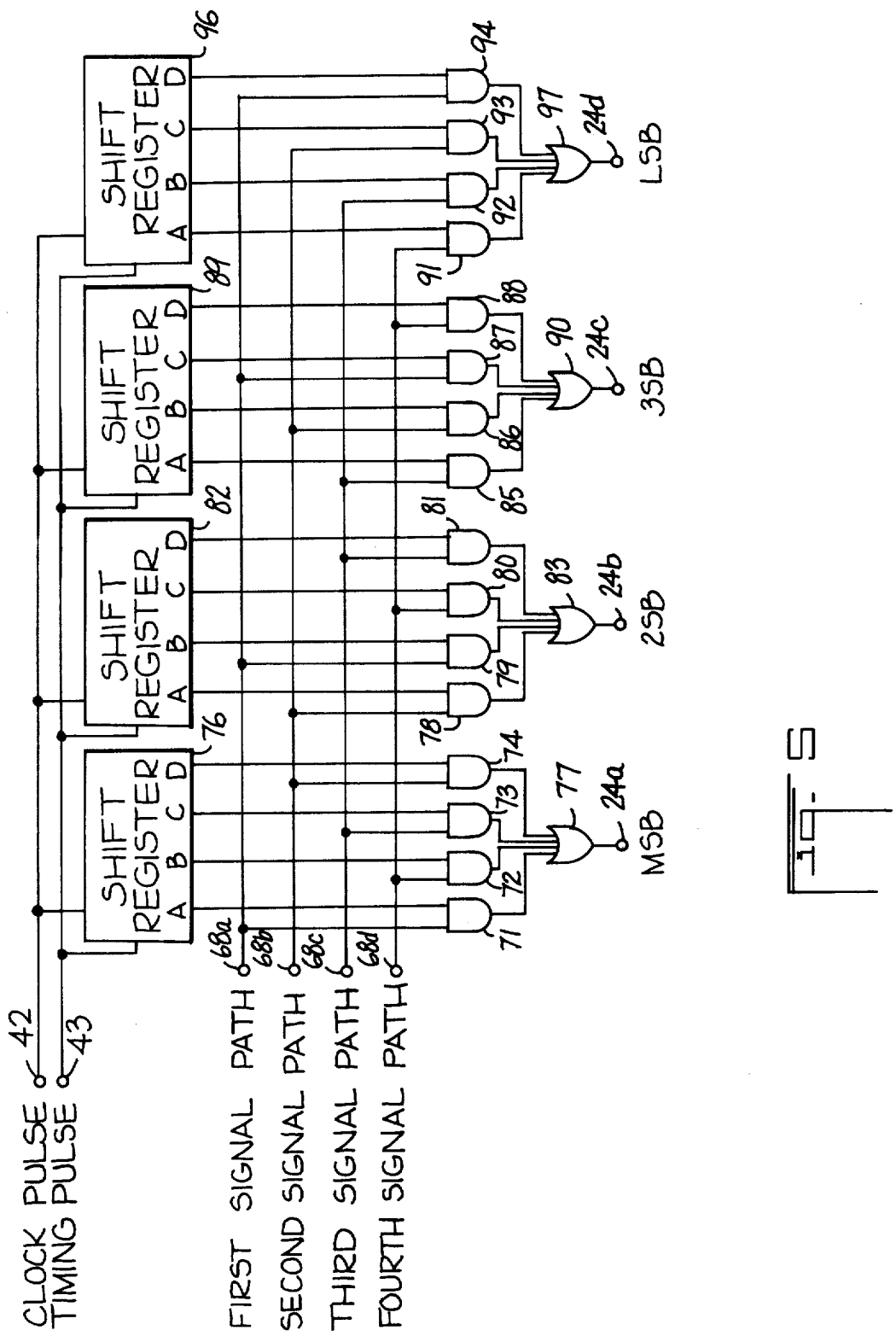
FIG. 5 is a logic switching circuit similar to that in FIG. 4A to be used at the output of the signal transmission paths to return the bit signals to their correct relationship.

The system in FIG. 1 includes an input terminal 11 connected to a sample-and-hold circuit 12 which in turn is connected to an analog-to-digital (A/D) converter 13. The converter has, in this embodiment, four output terminals 14a-14d, each of which is connected to an input terminal of a signal modulating circuit 16a-16d. The signal modulating circuits, which are switching circuits in accordance with this invention and are described more fully hereinafter, are connected through amplifiers 17a-17d to magnetic tape recording heads 18a-18d aligned to record information on four separate tracks on a magnetic tape 19.

Also shown in FIG. 1, although not necessarily used in such close proximity to the recording section of the circuit, is a reproducing section that includes four playback heads 21a-21d aligned to pick up signals recorded on the same four tracks produced by the heads 18a-18d, respectively. The playback heads 21a-21d are connected respective amplifiers 22a-22d, and these in turn are connected to signal demodulating circuits 23a-23d that correspond to the modulating circuits 16a-16d. These demodulating circuits are applied to four input terminals 24a-24d of the digital-to-analog (D/A) converter 26. The output terminal of the converter 26 is indicated by reference numeral 27.

The operation of the circuit in FIG. 1 will be described in connection with the charts shown in FIGS. 2 and 3. In the chart in FIG. 2A the boxes indicated $A_1$-$A_5$ may be considered as digital bit signals recorded on one channel, or track, of the tape 19. There are four such channels arranged in decreasing order of bit significance, channel 1 being the channel for the most significant bit (MSB) and channel 4 being the channel for the least significant bit. A fifth channel for timing pulses (TP) is also included. The time intervals $T_1$-$T_5$ indicated at the bottom of each of the vertical columns in the right-hand section of FIG. 2A are the times at which an input analog signal applied to the terminal 11 is sampled by the sample-and-hold circuit 12 and is converted by the A/D converter 13 into digital form. The individual bits of the digital signal that correspond to the analog signal during the time $T_1$ are identified as $A_1$-$D_1$ and are in the first column along with the time signal $T_1$. Subsequent groups of bit signals $A_2$-$D_2$, $A_3$-$D_3$, etc, are also shown in the digital pattern in FIG. 2A.

Under perfect conditions, the analog signal applied to the input terminal 11 and converted by the A/D converter 13 into, in this embodiment, a four-digit signal, would be recorded as a digital signal in the four tracks of the tape 19 by means of the four recording heads 18a-18d, and these signals would be picked up by the playback heads 21a-21d and reconverted by the D/A converter 26 into an analog signal at the output terminal 27. Each of the bit signals $A_1$-$D_5$ could be either a 1 or a 0, as required to correspond to the encoded signal.

The timing signal $T_1$-$T_5$ recorded in the fifth track identify the time of the groups of pulse signals that carry the information.

Unfortunately, as is indicated in FIG. 2B, it occasionally happens that some of the bit signals $A_1$-$D_5$ are not properly recorded or, at least, are lost before they reach the D/A converter 26. These signals are dropped out and are indicated by the dotted reference letters and numerals in FIG. 2B. The track for time pulses of FIG. 2A is also omitted from FIG. 2B, but otherwise the chart in FIG. 2B is the same as that in FIG. 2A. It should be recognized that the four channels for transmission of information signals are not necessarily four tracks on a magnetic tape. They may be other electrical signal carrying transmission paths. They are electrically parallel in the sense that all of the digits of the digital signal for a specific time interval, such as the time interval $T_1$, may be transmitted simultaneously, but they are not necessarily physically parallel in the sense that four tracks on a magnetic tape are physically parallel.

In reconstructing an analog signal from the signals indicated in the chart in FIG. 2B, it would be reasonable to transmit each of the bit signals, such as the signal $A_1$, to a delay line that would delay it for one timing interval $T_1$ of the timing pulses $T_1$-$T_5$ listed in the chart in FIG. 2A. The reproduced signal could also be applied directly to an adding circuit, and if, as is indicated in FIG. 2B, the second bit signal $A_2$ is missing, the bit signal $A_1$ with the same weighting factor could be substituted for the signal dropped out of the area $A_2$. However, where there are two successive dropouts, as indicated for the bit signals $A_2$ and $A_3$, it becomes difficult to correct for the second dropout. There are also two successive dropouts $C_4$ and $C_5$ in the third track.

In FIGS. 3A and 3B are charts corresponding to a switching arrangement for avoiding the adverse effect of successive dropouts in the transmission path represented in FIG. 1 as a length of magnetic tape 19. The left-hand chart in FIG. 3A is indicated by reference numeral 28 and corresponds to the chart in FIG. 2A. This chart may be thought of as the chart representing signals at the output terminals 14a-14d of the A/D converter 13 in FIG. 1. The signals $A_1$-$D_5$ along with the timing signals $T_1$-$T_5$ of the chart 28 may also be considered as signals on a magnetic tape at locations indicated by the respective boxes on the chart. As indicated by an arrow at the right-hand side of the chart 28, the signals are applied to a switching circuit 29. This switching circuit may be thought of as a multi-level commutator switching having one rotating arm for each of the four signal paths for the information bit signals $A_1$-$D_5$. The timing signals $T_1$-$T_5$ need not be switched or commutated. However, the timing signals do control the operation of the commutation switching. Although the commutator switches are spoken of as if each had a movable arm, this is for illustrative purposes. In actual practice the switching means collectively identified by reference numeral 29 would be solid-state switching means. However, the analogy to a mechanical switch facilitates the description of circuit connections and operation.

Each of the switching sections of the multi-section switching means 29 has the same number of output terminals as the number of switching sections. The number of switching sections, and therefore the number of input terminals and the number of output terminals in this example is four. In FIG. 3A the four output terminals of each commutator switching section are directly connected to corresponding output terminals of the other switching section so that the switching means 29 has a total of four output terminals. These are identified in numerical order in the chart 31 which may be considered to represent the amplifiers 17a-17d of FIG. 1 along with another amplifier for the timing signals. As indicated, the first four signals paths indicated in the chart 31 are connected to the recording heads 18a-18d and the timing signals are connected to another recording head 18e.

The arms of the four commutator switching sections in the switching means 29 are phased with respect to their fixed terminals so that, during the first interval when the group of signals $A_1$-$D_1$ are being transmitted through the system, they are transmitted along the same signal path order in which they are applied to the switching means 29. During the second time interval, the four commutator switching sections of the switching means 29 change to a different relationship so that the MSB signal $A_2$ is now applied to the fourth path and the other bit signals $B_2$-$D_2$ are each applied to the next numerically lower signal path than were the bits $B_1$-$D_1$. This same commutation switching continues during the third interval of time for the bits $A_3$-$D_3$ and in the fourth interval of time for the bits $A_4$-$D_4$. By the fifth interval of time, the commutation has returned to its original relationship since there are the same number of such relationships as there are bit signal levels. The timing signals $T'_1$ and $T'_2$, therefore, are only required to have a repetition rate ¼ the repetition rate of the commutation switching.

FIG. 3B represents the output section of a system to reconstitute the digital signals that have been recorded on a magnetic tape by means of the recording heads 18a-18e in FIG. 3A. These signals are picked up from the tape by the playback heads 21a-21e. As in the case illustrated in FIG. 2B, two successive bit signals transmitted along the first signal path and two other successive bit signals transmitted along the third signal path have been dropped out. The dropped out signals are represented by dotted reference characters $B_2$, $C_3$, $B_4$, and $C_5$ in the chart 32 that may be considered to represent the four amplifiers 22a-22d of FIG. 1 plus another amplifier for the timing signals. The signals in the four signal paths represented in the chart 32 are applied to switching means 33 that performs the converse switching operation of the switching means 29 in FIG. 3A and thereby returns the bit signals to their original relationship as indicated by a chart 34.

Because of the commutation of the bit signals by the switching means 29 in the input section of the system illustrated in FIG. 3A, the fact that two successive bit signals are dropped out as they pass through the first signal transmission path does not mean that these will both be MSB signals. The signal $B_2$ is a 2SB signal and the signal $C_3$ is a 3SB signal. It happens that the signals dropped out in transmission through the third signal transmission path are also a 2SB signal $B_4$ and a 3SB signal $C_5$. As may be seen by reference to FIG. 2B, these latter two bit signals would both have been 3SB signals if there had been no commutation by the switching means 29.

The reverse commutation operation performed by the switching means 33 in FIG. 3B returns the bit signals to their original relationship. It will now be seen that the dropped out signal $B_2$ both succeeds and follows properly transmitted 2SB signals, which are the signals $B_1$ and $B_3$. The same thing it true of the dropped out signals $B_4$, $C_3$, and $C_5$. This simplifies the compensation or interpolation of these digital signals. In each instance, a dropped out signal, for example the signal $B_2$, can be replaced by either the preceding signal $B_1$ or the succeeding signal $B_3$ according to the following table:

| $B_1$ | $B_3$ | $B_2$ |
|---|---|---|
| 1 | 1 | 1 |
| 0 | 0 | 0 |
| 1 | 0 | 1 or 0 |
| 0 | 1 | 0 or 1 |

The logic of the table is that if both the preceding and succeeding bit signals that have the same weighting factor are 1 signals, it will be assumed that the dropped out signal is a 1. Correspondingly, if both are 0, the dropped out signal will be assumed to be a 0. However, if the preceding signal is a 1 and the succeeding signal is a 0, or vice versa, it is considered to be indeterminate as to whether the dropped out signal is a 1 or a 0, and in that case the system may be arbitrarily connected to select either the preceding signal or the succeeding signal as a replacement for the dropped out signal. In any case, when the reconstituted digital signal is reconverted to an analog signal, its amplitude will be relatively close to the amplitude of the preceding and succeeding signals.

FIG. 4 is a logic circuit diagram of switching means suitable for use as the switching means 29 in FIG. 3A to switch the four-bit parallel PCM signal. The switching means has four input terminals 14a–14d which are the same as in the circuit in FIG. 1. These input terminals receive, respectively, the MSB, 2SB, 3SB, and LSB signals. The input terminals 14a–14d are connected, respectively, to four AND gates 36–39. A second input terminal for each of these AND gates is connected to a respective output terminal A–D of a shift register 41 that receives clock pulse signals by way of an input terminal 42 and timing pulse signals by way of an input terminal 43. The four output terminals of the AND gates 36–39 are connected to input terminals of an OR gate 44, the output of which may be connected to the input terminal of the amplifier 17a in FIG. 1.

The switching means in FIG. 4A also includes a second set of four AND gates 46–49, each having one input terminal connected, respectively, to the terminals 14b–14d and 14a. A second terminal of each of the AND gates 46–49 is connected to a respective output terminal A–D of a second shift register 51, and the four output terminals of the AND gates 46–49 are connected to respective input terminals of an OR gate 52. The output of the OR gate 52 may be connected to the input terminal of the amplifier 17b in FIG. 1.

A third set of AND gates 54–57 is provided. Each of the latter AND gates has an input terminal connected, respectively, to the terminals 14c, 14d, 14a, and 14b. A second input terminal of each of the AND gates 54–57 is connected to a respective output terminal A–D of a shift register 58 and the four output terminals of the AND gates 54–57 are connected to input terminals of an OR gate 59.

The fourth switching circuit includes four AND gates 61–64 having their input terminals connected, respectively, to the terminal 14d and terminals 14a–14c. Each of the AND gates 61–64 has a second input terminal connected to a respective output terminal A–D of a shift register 66. The shift registers 51, 58, and 66 are connected, like the shift register 41, to the clock input terminal 42 and the timing signal input terminal 43. The output terminals of the four AND gates 61–64 are connected to the input terminals of an OR gate 67, the output of which is connected to the amplifier 1d in FIG. 1.

FIG. 4B shows a series of clock pulses $T_1$ - $T_4$ applied to the clock pulse input terminal 42 in FIG. 4A and a series of timing pulses $T'_1$ - $T'_3$ that have a repetition rate ¼ as great as the repetition rate of the clock pulses and a duty cycle of approximately 25%. The timing pulses applied to the input terminal 43 causes the respective A output terminals of the shift registers 41, 51, 58, and 66 to go to the 1 level and thereby enable the AND gates 36, 46, 54, and 61, respectively. This permits the MSB signal, which may be either a 0 or a 1, to pass through the first AND gate 36 and OR gate 44 to the amplifier 17a in FIG. 1 to be recorded on the first track of the tape 19. Simultaneously, the 2SB signal can pass through the AND gate 46, the 3SB signal can pass through the AND gate 54, and the LSB signal can pass through the AND gate 61. The bit signals at any level can be 0 or 1. This represents the condition illustrated in FIG. 3A in which the first set of bit signals $A_1$ - $D_1$, constituting a word, passes through the switching means 29 to the recording heads 18a–18d.

During the second interval of time beginning with the occurrence of the next clock pulse applied to the input terminal 42, which may be the clock pulse $T_2$, the A output terminals of the shift registers 41, 51, 58, and 66 drop to 0, and the B output terminals rise to the 1 level, thereby disabling the AND gates 36, 46, 54, and 61 and enabling the AND gates 37, 47, 55, and 62. Under such circumstances the 2SB signal passes through the AND gate 37 and the OR gate 44, the 3SB signal passes through the AND gate 47 and the OR gate 52, the LSB signal passes through the AND gate 55, and the OR gate 59, and the MSB signal passes through the AND gate 62 and the OR gate 67. This results in the commutation illustrated for the bit signals $A_2$–$D_2$ of a second word in the chart 31 in FIG. 3A. Successive clock pulses at the input terminal 42 shift the timing pulse to the respective C output terminals of the shift registers and then to the D output terminals to effect the commutation of the bit signals $A_3$- $D_3$ and $A_4$- $D_4$ of succeeding word in the chart 31 in FIG. 3A.

FIG. 5 is a logic circuit diagram of switching means suitable for use as the switching means 33 in the playback section in FIG. 3B. The switching means in FIG. 5 is arranged to reverse-convert the signals picked up from the tape 19 in FIG. 1 or from such other parallel signal transmission paths as may be used in the overall system.

The switching means in FIG. 5 has four input terminals 68a–68d, which may be considered to be connected to the output terminals of the amplifiers 22a–22d in FIG. 1. One input terminal of each of the four AND gates 71–74 is connected, respectively, to the input terminals 68a, 68d, 68c, and 68b. A second input terminal for each of these AND gates is connected to a respective output terminal A–D of a shift register 76 that receives the same clock pulse signals shown in FIG. 4B, which may be derived by multiplying the frequency of the timing pulse signal also shown in FIG. 4B and applied to the input terminal 43. The four output terminals of the AND gates 71–74 are connected to input terminals of an OR gate 77, the output terminal 24a of which is shown in FIG. 1 as being connected to an input terminal of the D/A converter 26.

The switching means in FIG. 5 also includes a second set of four AND gates 78–81 connected to the input terminals 68b, 68a, 68d, and 68c, respectively. These AND gates also have a second input terminal connected, respectively, to output terminals A–D of a shift register 82. The output terminals of the AND gates 78–81 are connected to input terminals of an OR gate 83 the output terminal 24b of which is connected to the D/A converter 26 in FIG. 1.

The switching means in FIG. 5 further includes a set of AND gates 85–88 having input terminals connected, respectively, to the terminals 68c, 68b, 68a, and 68d. These AND gates also have input terminals connected, respectively, to output terminals A–D of a shift register 89, and the output terminals of the AND gates are connected to input terminals of an OR gate 90. The output terminal 24c of the OR gate 90 is connected to the D/A converter 26 in FIG. 1.

The final section of the switching means in FIG. 5 includes four more AND gates 91–94 having input terminals connected to the terminals 68d, 68c, 68b, and 68a, respectively. These AND gates also have input terminals connected, respectively, to the terminals A–D of a fourth shift register 96. The output terminals of the AND gates 91–94 are connected to input terminals of an OR gate 97 that has its output terminal 24d connected to the D/A converter 26 in FIG. 1.

In the operation of the switching circuit in FIG. 5, the signals on the first track of the tape 19 in FIG. 1 or the first one of four signal transmission paths applied to the input terminal 68a pass through the AND gate 71 and the OR gate 77 during the first conversion interval, through the AND gate 79 and the OR gate 83 during the second conversion interval, through the AND gate 87 and the OR gate 90 during the third conversion interval, and through the AND gate 94 and the OR gate 97 during the fourth conversion interval. Referring back to FIG. 4A shows that this corresponds to the fact that during the first conversion interval the MSB is applied through the AND gate 36 to the OR gate 44 and from there to the first signal path during the first conversion interval and that the 2SB, 3SB, and LSB signals are applied to the same signal path during the next three successive conversion intervals. Corresponding analysis of the circuits supplying signals to the output terminals 24b, 24c, and 24d shows that there is a corresponding relationship to derive the 2SB, 3SB, and LSB signals, respectively, from these output terminals. Thus, the reconverted signals are as represented in the chart 34 in FIG. 3B.

This chart also illustrates the dropped out bit signals $B_2$, $C_3$, $B_4$, and $C_5$, which were dropped out of the system somewhere between the amplifiers represented by the chart 31 in FIG. 3A and the playback heads 21a–21d in FIG. 3B. Since there are seldom dropout signals in two or more magnetic recording tracks or other signal transmission paths simultaneously, the dropped out signals illustrated in the chart 34 are isolated and can easily be replaced by comparison with corresponding bit signals of the same weighting factor in the preceding or succeeding group of signals.

As stated previously, it is unnecessary to provide a separate signal transmission path for the timing signals or clock signals. Self-clock type pulse code modulation signals may be obtained by dynamic modulation (DM) or phase encoding (PE) modulation. FIG. 6 shows an embodiment according to the present invention in which the digital signals in parallel form, that is with all of the bit levels present simultaneously, are subjected to DM prior to being recorded.

A DM signal is a PCM signal that has the following characteristics: (1) when the NRZ signal is a 1, the polarity of the DM signal is reversed at the center position of a bit interval, which is an interval during which a single bit is present. (2) when the NRZ signal is a 0, the polarity is not changed, unless the NRZ signal remains at the 0 value for two bit intervals. (3) when the NRZ signal remains at the 0 level for two bit intervals, the polarity is changed at the time that defines the boundary between adjacent bits.

Figure 6A:
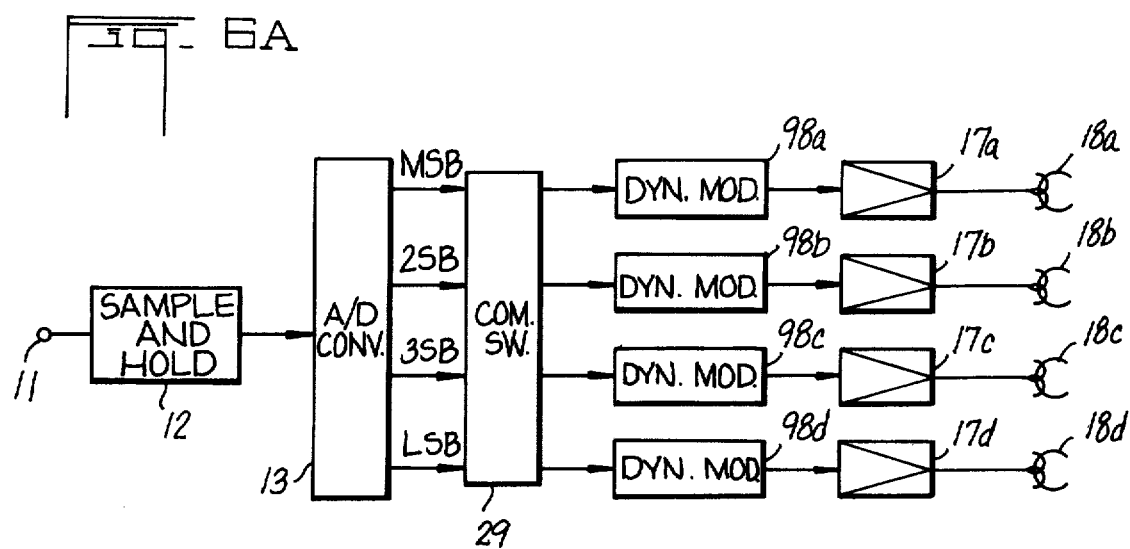
FIG. 6A shows the signal input section of a switching system using pulse code modulation and dynamic modulation in accordance with this invention.
Figure 6B:
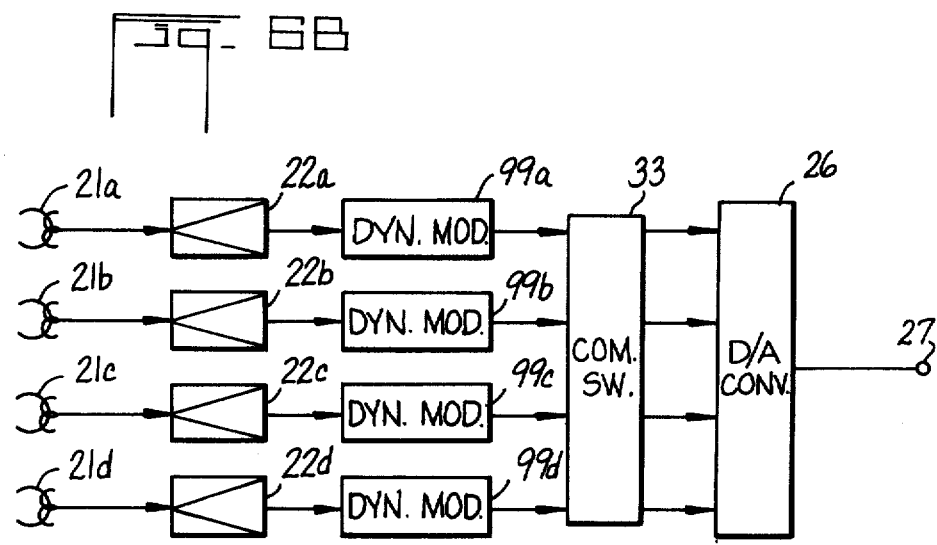
FIG. 6B is the output section of a system to reconstitute an analog signal acted upon by the section of the system shown in FIG. 6A.

By using a DM signal it is possible to encode the clock signal into the DM signal and to extract it later. This improves the utilization of tape or other signal transmission path medium by eliminating the need for a separate clock signal transmission path. However, it is important to apply DM to the signals after the various bit levels have been switched in the input section of the system and to apply the reverse DM to the various bit levels before they are switched back in the output section. The proper circuit arrangement for the input section is shown in FIG. 6A and for the output section is shown in FIG. 6B. These correspond, respectively, to the input and output sections of FIG. 1 and the same reference numerals have been used to apply to corresponding circuit elements. In addition, the switching means 29 in FIG. 6A corresponds to the switching means of the same reference numeral in FIG. 3B, and the switching means 33 in FIG. 6B corresponds to the switching means 33 in FIG. 3B. There are also four standard DM circuits 98a–98d connected in the respective signal paths between the switching means 29 and the amplifiers 17a–17d. These DM circuits follow the requirements previously set forth for determining the relationship between input and output signals. FIG. 6B shows four corresponding reverse DM circuits 99a–99d connected in the respective circuit paths between the amplifiers 22a–22d and the switching means 33. These reverse DM circuits return the signals to their original configuration before applying them to the switching means 33.

Figures 7A, 7B, 7C, 8A, 8B, 8C:
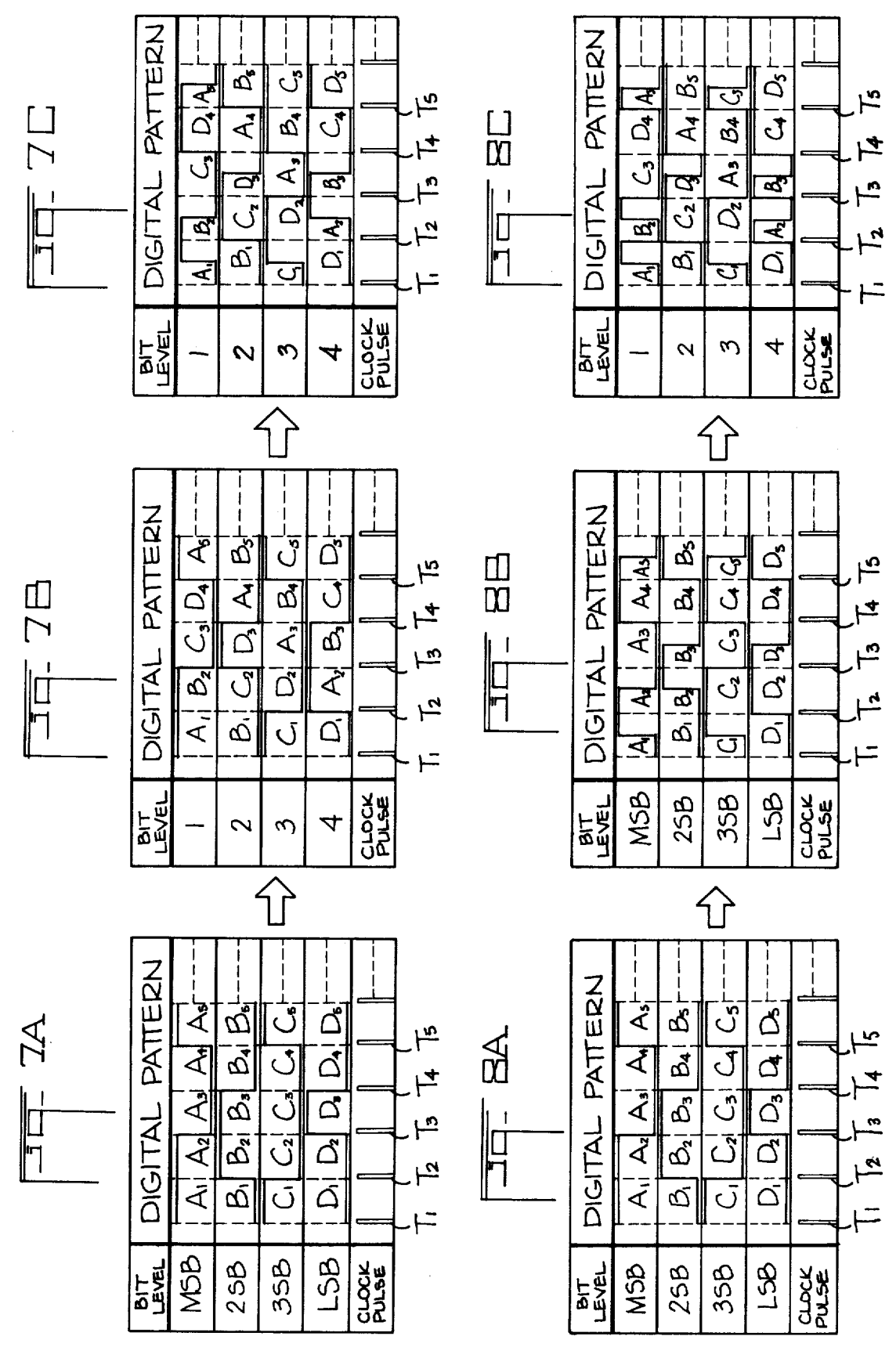

FIG. 7A is a chart of an arbitrarily selected PCM signal applied to the switching means 29 in FIG. 6A. In accordance with the fact that any of the bits $A_1$–$D_5$ can be either a 0 or a 1, it is arbitrarily assumed that the bits $A_1$ and $A_2$ are 1's, the bits $A_3$ and $A_4$ are 0's, the bit $A_5$ is a 1, and so on.

FIG. 7B shows the corresponding signals at the output of the switching means 29 in FIG. 6A after the bits have been subjected to a commutation type of switching as described previously in this specification.

FIG. 7C shows the respective output signals of the DM circuits 98a–98d on the four channels after the PCM signals shown in FIG. 7B have been subjected to the DM process. For example, the first DM circuit 98a responds to the first bit signal, which has a value of 1, by changing its polarity in the middle of the first interval. It is arbitrarily assumed that the previous value was 0 and so, during the bit interval between the times $T_1$ and $T_2$, the bit value changes from 0 to 1 as shown in the upper left-hand section of FIG. 7C. The DM circuit 98a responds to the bit signal $B_2$, which also has a value of 1, by again reversing its polarity in the middle of the bit interval from 1 to 0. It responds to the 0 bit signal $C_3$ by not reversing its value but remaining at 0. It responds to the second successive 0 bit signal $D_4$ by reversing polarity at the boundary between the bit signals $C_3$ and $D_4$ to have a value of 1. It responds to the 1 bit signal $A_5$ by reversing polarity in the middle of the interval. The other DM circuits 98b–98d operate correspondingly.

It will be noted that the signals produced by the DM circuits 98a–98d connected as shown in FIG. 6A do not change polarity more often than the most rapidly changing signals illustrated in FIG. 7A. Thus, the maximum frequency required to transmit the DM signals shown in FIG. 7C is no greater than that required for the signals in FIG. 7A.

The output section shown in FIG. 6B includes standard reverse DM circuits 99a–99d to return the signals of the form shown in FIG. 7C to the form shown in FIG. 7B so that they can be switched back by the switching means 33 to the form shown in FIG. 7A to be applied to the D/A converter 26.

If the DM circuits 98a–98d were placed between the A/D converter 13 in FIG. 6A and the switching means 29, the operation would be changed to that shown in FIGS. 8A–8C. FIG. 8A corresponds exactly to FIG. 7A and illustrates an arbitrarily chosen digital signal pattern at the output of the A/D converter 13. If this signal is immediately applied to the DM circuits 98a–98d, the resulting DM signals are shown in FIG. 8B. However, if these signals, some of which shift polarity in the middle of a bit interval between a time $T_n$ and $T_{n+1}$, are switched only at the ends of the times $T-T_5$, the effect of such switching is shown in FIG. 8C. This switching operation sometimes produces pulses having one-half the duration of the original pulses and thus requiring twice the bandwidth to handle them.

It is to be understood that the present invention has been described in general terms with reference to standard elements combined in a novel manner. However, the arrangement of circuit elements is not limited to the specific embodiments shown, and the true scope of the invention is set forth in the following claims.

What is claimed is:

1. A signal handling system comprising:
   A. a plurality of electrically parallel signal paths over which successive groups of encoded pulse signals are transmitted, each of the pulse signals in a group having a certain weighting factor, a like plurality of input terminals to which each group of pulse signals is applied at a certain rate, those pulse signals having the same weighting factor in respective groups being applied to a corresponding one of said input terminals; and
   B. means for switching signals from each of the input terminals to a different one of the paths in a determinable order at the same rate as the rate at which said pulse signals are applied, whereby successive pulse signals of the same weight in successive groups are not transmitted through the same path in succession so as to substantially minimize the possibility of having two successive dropouts of the same pulse weight in any path.

2. The signal handling system of claim 1 in which said means for switching signals comprises:
   A. logic circuit means connected to the input terminals to receive the pulse signals applied thereto and having output terminals connected to the transmission paths; and
   B. timing means to make the switching means conductive according to a time pattern such that, for each group of pulse signals, the pulse signals in that group having different weighting factors will be connected to different transmission paths and the pulse signals of the next succeeding group and having the same weighting factors will be connected to different ones of said transmission paths.

3. The signal handling system of claim 2 in which there are the same number of said logic circuit means as said transmission paths.

4. The pulse handling system of claim 1 in which said paths comprise output sections and said system comprises, in addition, second switching means connected to said output sections to switch the signals therefrom back to the order of said groups of pulse signals representative of signals encoded.

5. The signal handling system of claim 1 comprising, in addition, modulation means connected in series between said switching means and each said different one of said paths to modulate the signals from said switching means with timing information representing said rate at which said signals are switched from said input terminals to said signal paths.

6. The signal handling system of claim 5 in which each of said paths has an output section and said system comprises, in addition:
   A. second switching means for switching signals from each of said output sections to return the relationship of the signals to that of said groups of pulse signals representative of signals encoded; and
   B. reverse modulation means connected between said output sections of each of said paths and said second switching means to demodulate the timing information modulated onto said signals from the first-mentioned switching means and restore said signals to their original form.

7. The signal handling system of claim 1 in which said switching means comprises:
   A. $n$ commutator switching sections, each comprising:
      1. a switchable, conductive path connected to a respective input terminal, and
      2. $n$ output terminals, each of the output terminals of each switching section being connected to a respective one of said transmission paths, the switchable, conductive path of each of said switching sections connecting its respective input terminal at each instant to a different one of the transmission paths than any of the other switchable, conductive sections; and
   B. actuating means to advance said switchable, conductive sections from connection to one of said transmission paths to the next transmission path at said certain rate.

8. A signal handling system comprising:
   A. a plurality of electrically parallel signal paths over which groups of pulse signals representative of encoded signals are transmitted, each of the pulse signals having a certain weighting factor, a like plurality of input terminals to which respective pulse signals in each group are applied at a certain rate, those pulse signals having the same weighting factor being applied to the same one of said input terminals; and
   B. means connected between said input terminals and said paths for switching signals from each of the input terminals to a different one of the paths in a determinable order at a repetition rate synchronous with said certain rate such that, for each group of said signals switched to the paths, the pulse signals of the next adjacent group and having the same weighting factors are connected to a different ones of said paths so as to substantially minimize the possibility of having two successive dropouts of the same pulse weight in any path.

9. A signal handling system comprising:
A. $n$ parallel signal paths to which successive groups of $n$ encoded pulse signals are applied at a certain rate, each of the pulse signals in a group having a certain weighting factor, those pulse signals having the same weighting factor in respective groups being applied to a corresponding one of said paths;
B. logic circuit means connected to said paths to receive the successive groups of $n$ encoded pulse signals, said logic circuit means having $n$ output terminals; and
C. timing means connected to said logic circuit means for actuating said logic circuit means in synchronism with said certain rate to switch each of the $n$ signals in a group to a correspondingly different one of the $n$ output terminals in a determinable order according to a predetermined time pattern such that each succeeding signal of the same weight will be connected, in order, to different ones of said output terminals so as to substantially minimize the possibility of having two successive dropouts of the same pulse weight in any path.

10. The signal handling system according to claim 9 in which said logic circuit means comprises $n$ switching circuits, each switching circuit having $n$ input terminals connected to a different corresponding signal path to receive the respective signals applied to said paths, and comprising
$n$ AND gates, each having a first AND gate input a second AND gate input and an AND gate output, the first AND gate input of each AND gate being connected to a different respective input terminal of said switching means and the second AND gate input of each AND gate being connected to said timing means to receive an actuating signal from said timing means, such that said actuating signal is applied to successively different ones of said second AND gate inputs in a determinable order at said certain rate at which successive groups of $n$ encoded pulse signals are applied to said parallel paths, whereby the AND gate receiving the actuating signal at its second AND gate input operates to provide at its AND gate output the encoded pulse signal provided at its first AND gate input, and an OR gate have $n$ OR gate input terminals, each said OR gate input terminal being connected to a different one of said gate outputs, said OR gate providing the encoded pulse signal appearing at the AND gate output of said operated AND gate to a corresponding one of the output terminals of said logic circuit means.

11. The signal handling system according to claim 10 in which said timing means comprises
A. means for supplying a series of pulses at a repetition rate synchronous with the rate at which said successive groups of $n$ encoded pulse signals are applied; and
B. $n$ shift registers, each corresponding to a different respective switching circuit and having $n$ register output terminals, each of said shift registers receiving said series of pulses to provide said actuating signal for application to said second AND gate inputs at different ones of said $n$ register output terminals in succession and at the same rate as the rate at which said successive groups of $n$ encoded pulse signals are applied.

* * * * *